Jan. 29, 1963   J. MÜLLER   3,075,601
SUSPENSION OF A DRIVING UNIT IN A MOTOR VEHICLE
BY MEANS OF AN AUXILIARY FRAME
Filed Sept. 29, 1953   2 Sheets-Sheet 1
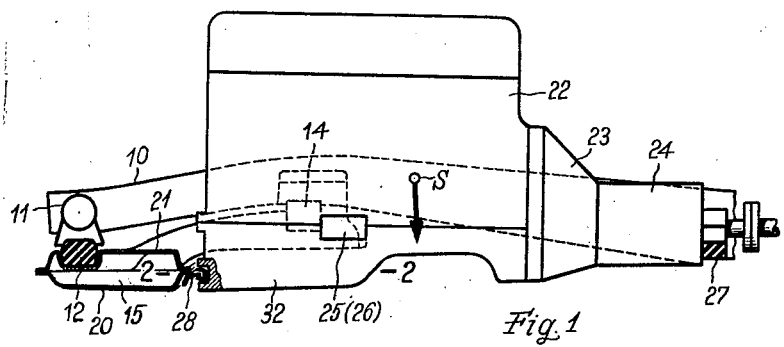
Fig. 1
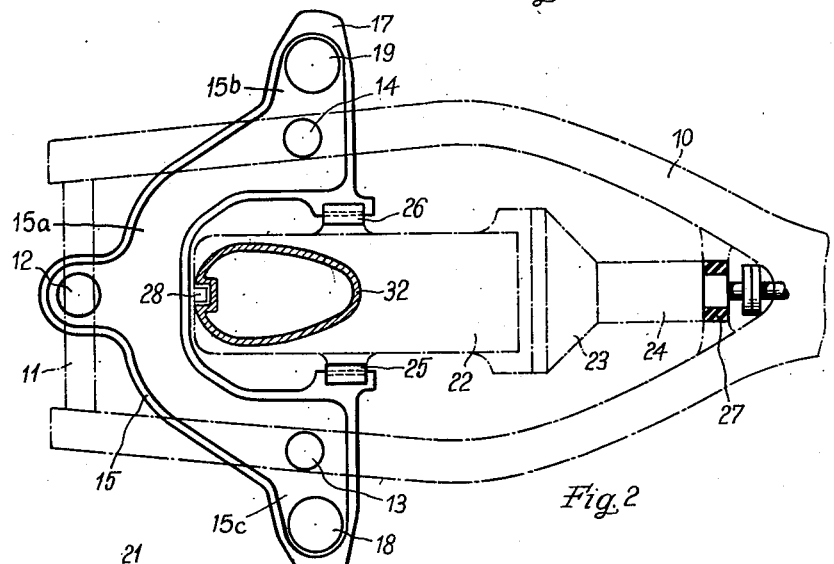
Fig. 2
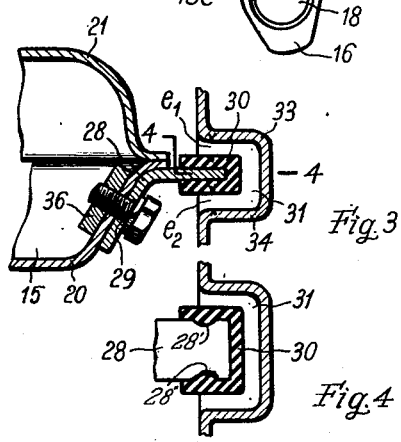
Fig. 3
Fig. 4
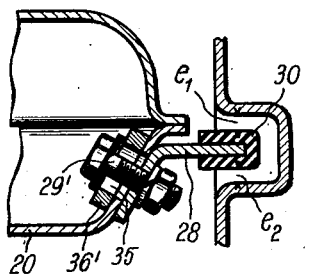
Fig. 5
INVENTOR.
JOSEF MÜLLER
BY
Dicke and Craig.
ATTORNEYS

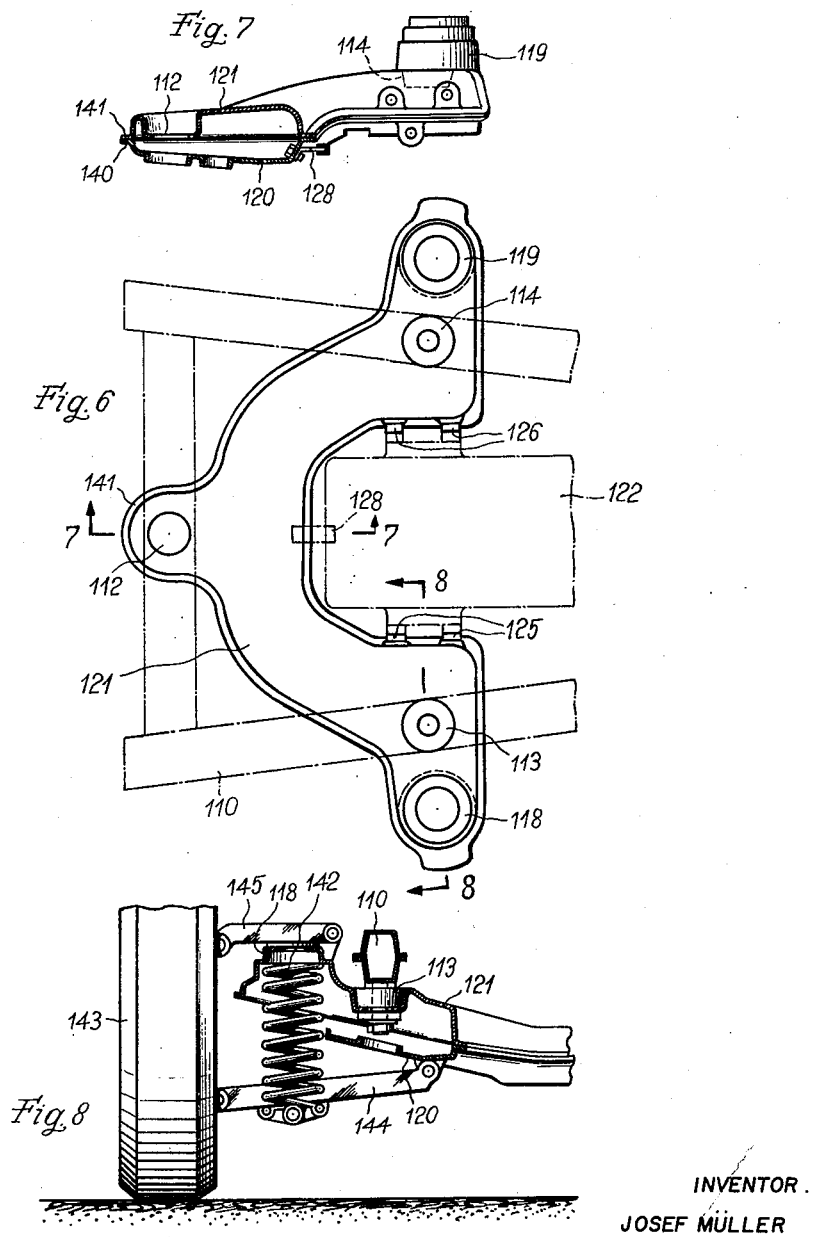

United States Patent Office 3,075,601
Patented Jan. 29, 1963

3,075,601
SUSPENSION OF A DRIVING UNIT IN A MOTOR VEHICLE BY MEANS OF AN AUXILIARY FRAME
Josef Müller, Stuttgart, Germany, assignor to Daimler-Benz Aktiengesellschaft, Stuttgart-Unterturkheim, Germany
Filed Sept. 29, 1953, Ser. No. 383,023
Claims priority, application Germany Oct. 2, 1952
9 Claims. (Cl. 180—64)

This invention relates to a suspension of a driving unit in a motor vehicle employing an auxiliary frame or member secured to the remaining vehicle, particularly by elastic means which enables the auxiliary frame to be separated therefrom and which auxiliary frame has the driving unit resiliently supported or mounted thereon, preferably by interposition of elastic members, and particularly in such a manner that the support is provided only in part by the auxiliary frame and as to the other part by the remaining vehicle, preferably also in an elastic manner.

Such type of a suspension of the driving unit comprising in general the engine or engine and gear box or also a transmission assembly provides, on the one hand, the advantage of simplifying the mounting of the driving unit and of further units, such as the wheel suspension, on the auxiliary frame or member, and, on the other hand, offers as an additional advantage the possibility of mounting the unit on the remaining vehicle very softly and elastically. If the driving unit is only partially connected to the auxiliary frame or member which in turn is preferably resiliently connected to the remaining vehicle, the resiliency may be taken up not only by relative vertical movements between the driving unit and the auxiliary frame or member but also by relative angular movements of the same. On the other hand, such great resiliency is disadvantageous inasmuch as heavy shocks will produce extreme downward swinging movements of the driving unit which may cause that above all on uneven roads the housing of the driving unit and in particular the oil sump of the engine crankcase contacts the road thereby damaging the driving unit. This will be true to a still higher degree if the auxiliary frame or member is also elastically connected to the main frame or the car body so that the auxiliary frame or member will also be capable of swinging in the vertical direction.

It is an object of the present invention to avoid the aforementioned drawbacks and to prevent the driving unit from being deflected too far down.

A further object of the invention is to provide an arrangement whereby the buckling of driving unit and auxiliary frame with relation to each other when separating the one or the other of these two parts from each other or when removing them in common from the main frame is prevented and the assembly thereof facilitated.

Accordingly a further feature of the present invention consists in that stop means is provided for limiting the relative movements between the driving unit and the auxiliary frame, such stop means being so positioned as to provide sufficient clearance to permit the full realization of a good spring suspension of the driving unit in case of light shocks and vibrations whilst at the same time exceedingly long strokes of the driving unit are effectively limited in the desired manner even if the auxiliary frame is also elastically mounted. The combined resiliency of the elastic mounting of the driving unit, on the one hand, and of the auxiliary frame on the other provides in that case a progressive springing power which attains a higher degree of stiffness after the stop means has gone into action or become active. It is preferable to provide elastic stop means in order to avoid shocks and noises.

A further feature of the invention is to provide an auxiliary frame of a convenient and simple construction which is as stiff as possible and which is also suitable above all for quantity production.

A further feature of the invention resides accordingly in that the auxiliary frame is manufactured of sheet steel stampings and in particular of two shell-type sheet steel stampings welded together at their edges to form a hollow body.

According to a further feature of the present invention the auxiliary frame is in the form of a fork or horse shoe.

Other objects and features will become apparent from the following detailed description of several embodiments given merely by way of example and taken in connection with the accompanying drawing in which:

FIG. 1 is a lateral view of one embodiment of the suspension of the driving unit using an auxiliary frame;

FIG. 2 is a top plan view of the arrangement shown in FIG. 1 partially in section along the line 2—2 of FIG. 1;

FIG. 3 is an enlarged vertical sectional view of the stop means;

FIG. 4 is a horizontal sectional view taken along the line 4—4 of FIG. 3;

FIG. 5 is a modification of the embodiment shown in FIG. 3;

FIG. 6 is a top plan view of an auxiliary frame according to a further embodiment of the invention;

FIG. 7 is a sectional view taken along the line 7—7 of FIG. 6;

FIG. 8 is a sectional view along the line 8—8 of FIG. 6.

In FIGS. 1 and 2 a fork-type frame 10 is shown with a front cross member 11. An auxiliary frame 15 is suspended from the fork-type frame by means of interposed rubber buffers diagrammatically shown as at 12, 13 and 14, this auxiliary frame having a cross member 15a and end members 15b and 15c substantially in the form of a fork or a horse shoe and carrying at 16 and 17 the wheel suspension such as two superposed link members or the like independently suspending the front wheels. Reference numerals 18 and 19 represent the upper spring abutments, such as for coil springs, which are supported at their lower ends preferably on the lower wheel suspension link members. The auxiliary frame 15 substantially comprises two sheet metal stampings such as a lower stamping 20 and an upper stamping 21 to make up its cross member 15a and end members 15b and 15c.

The driving unit comprising an engine 22, a clutch housing 23 and a gear box 24 is located between the auxiliary frame or member and the fork type frame 10. Two rubber buffers 25 and 26 substantially stressed in shear in the vertical direction support the driving unit laterally on the auxiliary frame 15 and a third rubber buffer 27 supports the rear end of the driving unit on the main frame 10, these rubber buffers forming a resilient three-point suspension.

If shocks occur in the vertical direction both the auxiliary frame and the driving unit are permitted to execute swinging movements in the vertical direction both with relation to the main frame 10 and relatively to each other. The resulting inertia force acting through the center of gravity S of the driving unit will cause such movements of the auxiliary frame and of the driving unit that in effect substantially a buckling action will take place between the auxiliary frame and the driving unit resulting in swinging motions of the auxiliary frame substantially about a transverse axis extending through the point of suspension 12 and of the driving unit substantially about a transverse axis extending through the point of suspension 27.

In order to prevent too great a deflection of the driving unit when soft rubber buffers are used, an arm or stop member 28 is provided on the auxiliary frame 15 according to the invention which consists of an angularly bent flat iron secured by means of a screw 29 to the lower part 20 of the auxiliary frame 15 at the location of a reinforcing member 36 which arm is covered at its free end by a cap 30 of an elastic or sound absorbing material anchored thereto by engaging the cut-out portions 28' and 28" provided in the arm 28. The arm 28 with its cap 30 projects into a recess 31 of the oil sump 32 of the engine in such a manner that it is spaced apart by a clearance $e_1$ from the upper wall 33 and by a clearance $e_2$ from the lower wall 34. As shown in FIG. 4, a clearance space is provided also in the lateral direction.

The clearances $e_1$ and $e_2$ are so dimensioned that the engine has the necessary space for its swinging motion within a central range towards both sides of a position of rest within which range a relatively low spring resistance is opposed to the swinging motions of the engine. Greater deflections cause the arm 28 through its lining 30 to engage the walls 33 and 34 which act as abutments so that a further movement of the engine in the vertical direction can take place only against the simultaneous resistance of the elastic buffers connecting the auxiliary frame to the main frame. An excessive downward movement of the engine with relation to the auxiliary frame is therefore limited by the clearance $e_1$. If desired, also the arm 28 may be made of a slightly resilient material.

If it is desired to remove the auxiliary frame together with the driving unit from the frame 10 by separating the connection at the points of suspension 12, 13, 14 and 27, this would cause downward tilting of the driving unit at its rear end under the weight acting upon the center of gravity S. This downward tilting is prevented by the stop means 28 hereinbefore mentioned as after a limited tilting movement of the driving unit covering the clearance $e_2$ the wall 34 will be contacted by the elastic stop member 28, 30 in order to prevent further tilting of the driving unit.

In the embodiment shown in FIG. 5 the bolt 29' extends through a slot 35 in the sheet stamping 20 and/or in the reinforcing member 36' which slot permits a height adjustment of the arm 28 and therewith an adjustment of the clearances $e_1$ and $e_2$.

In the embodiment shown in FIGS. 6 to 8, the auxiliary frame or member substantially comprises a lower sheet stamping 120 and an upper sheet stamping 121. Both stampings have shell-type cross-section and present at their edges outwardly directed flanges 140 and 141 respectively extending substantially over the entire length of the edges which flanges are secured to each other as by welding in such a manner that both stampings form a hollow body approximately in the form of a horse shoe.

The upper stamping 121 is provided with three inwardly pressed cup-shaped recesses 112, 113 and 114 serving to receive rubber buffers for connecting the auxiliary frame to the main frame 110 of the vehicle shown in FIG. 6 in dotted lines.

As best seen in FIG. 8 the upper stamping 121 is extended towards the sides of the vehicle beyond the lower stamping 120 and presents at its projecting ends upstanding cup or bell-shaped recesses 118 and 119 respectively serving, for instance, to receive coil springs 142 abutting from below against the interior of the recesses. Each of the road wheels 143 is guided by a pair of superposed link members 144 and 145 of which the upper one is pivoted to the upper stamping 121 and the lower to the lower stamping 120, the lower link member serving at the same time to support the spring 142 from below. The brackets (not shown) for the link members 144 and 145 may be welded to the stampings or—conveniently—detachably or adjustably connected thereto such as by interposing reinforcing members welded to the stamping.

For mounting the driving unit 122, the auxiliary frame, such as the upper stamping 121, is provided with reinforcing members 125, 126 welded thereto to which the engine is elastically connected at its front end. Similar connecting pieces may be provided for the steering gear, the radiator and other assemblies. A stop member 123 serves to limit the relative movements between the driving unit 122 and the auxiliary frame 120, 121.

The term "sheet metal stampings" is used herein to designate stampings made of sheet metal of such gauge as to enable manufacture thereof by stamping or pressing operations presently available.

What I claim is:

1. In a motor vehicle a main frame, a driving unit, an auxiliary frame, means for detachably connecting said auxiliary frame to said main frame, means for partially supporting said driving unit on said auxiliary frame in a first vertical transverse plane of the vehicle, means for partially supporting said driving unit resiliently on said main frame outside said auxiliary frame in a second vertical transverse plane of the vehicle located at a distance from said first transverse plane, and stop means between said driving unit and said auxiliary frame in a third vertical transverse plane also located at a distance from said first transverse plane in a direction opposite that of said second plane capable of limiting upon removal of said driving unit and said auxiliary frame from said main frame the relative movements between said driving unit and said auxiliary frame about a transverse axis and preventing buckling of the two last mentioned elements about said transverse axis.

2. In a motor vehicle the combination as defined in claim 1, first-mentioned, second mentioned and third-mentioned means comprising buffers of resilient material.

3. In a motor vehicle the combination as defined in claim 1, wherein said stop means comprises a stop member secured to one of the elements supported against each other consisting of the auxiliary frame and the driving unit, and two stop faces provided at the other of said last-mentioned elements of which stop faces one is above and the other below the stop member so that relative movements between said driving unit and said auxiliary frame are limited both in the upward and in the downward direction.

4. In a motor vehicle the combination as defined in claim 1, wherein said stop means comprises resilient buffers for elastically limiting relative movements between said driving unit and said auxiliary frame.

5. In a motor vehicle the combination as defined in claim 1, wherein said stop means comprises a stop member secured to one the two elements supported against each other, consisting of said auxiliary frame and said driving unit, and at least one counter stop member at the other of said two elements, and means for adjusting at least one of said two stop members in the directions of the relative movements to be limited by said stop members.

6. In a motor vehicle, a main frame, a fork-shaped auxiliary frame having a cross member and two end members connected by said cross member, resilient means for elastically connecting said auxiliary frame to said main frame at said cross member and at said two end members, a driving unit, resilient means for elastically supporting said driving unit intermediate both ends thereof on said end members of said auxiliary frame, resilient means for elastically supporting driving unit at one end thereof and opposite to said cross member of said auxiliary frame on said main frame, stop means at said cross member of said auxiliary frame, and stop means at said driving unit, said two stop means cooperating in such a manner that upon removal of said driving unit and said auxiliary frame from said main frame the relative movements between said driving unit and said auxiliary frame about a transverse axis are limited and buckling of said two last mentioned elements with relation to each other about said transverse axis is prevented.

7. In a motor vehicle a main frame, a driving unit, an auxiliary frame, means for detachably connecting said auxiliary frame to said main frame, means for partially supporting said driving unit on said auxiliary frame in a first vertical transverse plane of the vehicle, means for partially supporting said driving unit resiliently on said main frame outside said auxiliary frame in a second transverse plane of the vehicle located at a distance from said first plane, stop means between said driving unit and said auxiliary frame in a third transverse plane also located at a distance from said first transverse plane in a direction opposite that of said second plane and capable of limiting upon removal of said driving unit and said auxiliary frame from said main frame the relative movements between said driving unit and auxiliary frame about a transverse axis and thereby preventing buckling of the two last-mentioned elements about said transverse axis, a pair of opposite wheels, and means for springly suspending said wheels exclusively on said auxiliary frame.

8. In a motor vehicle a main frame, a driving unit, an auxiliary frame, means for detachably connecting said auxiliary frame to said frame, means for partially supporting said driving unit on said auxiliary frame in a first vertical transverse plane of the vehicle, means for partially supporting said driving unit resiliently on said main frame outside said auxiliary frame in a second transverse plane of the vehicle located at a distance from said first plane, stop means between said driving unit and said auxiliary frame in a third transverse plane also located at a distance from said first transverse plane in a direction opposite that of said second plane and capable of limiting upon removal of said driving unit and said auxiliary frame from said main frame the relative movements between said driving unit and said auxiliary frame about a transverse axis and thereby preventing buckling of the two last-mentioned elements about said transverse axis, and a pair of opposite wheels, said auxiliary frame extending in the longitudinal direction of the vehicle essentially only within the region of said wheels.

9. In a motor vehicle a main frame, a driving unit, an auxiliary frame, means for detachably connecting said auxiliary frame to said main frame, means for partially supporting said driving unit on said auxiliary frame in a first vertical transverse plane of the vehicle, means for partially supporting said driving unit resiliently on said main frame outside said auxiliary frame in a second transverse plane of the vehicle located at a distance from said first plane, stop means between said driving unit and said auxiliary frame in a third transverse plane also located at a distance from said first transverse plane in a direction opposite that of said second plane and capable of limiting upon removal of said driving unit and said auxiliary frame from said main frame the relative movements between said driving unit and said auxiliary frame about a transverse axis and thereby preventing buckling of the two last-mentioned elements about said transverse axis, a pair of opposite wheels, and means for suspending said wheels exclusively on said auxiliary frame whereby said main frame supports itself on said wheels only over said auxiliary frame, said auxiliary frame extending in the longitudinal direction of the vehicle substantially only within the region of said wheels.

References Cited in the file of this patent
UNITED STATES PATENTS

| | | |
|---|---|---|
| 1,948,745 | Curtiss | Feb. 27, 1934 |
| 2,013,599 | Butler | Sept. 3, 1935 |
| 2,027,898 | Broulhiet | Jan. 14, 1936 |
| 2,048,953 | Sherman | July 28, 1936 |
| 2,081,965 | Trott | June 1, 1937 |
| 2,173,515 | Eklund | Sept. 19, 1939 |
| 2,246,824 | Wheat | June 24, 1941 |
| 2,257,835 | Best | Oct. 7, 1941 |
| 2,299,935 | Slack | Oct. 27, 1942 |
| 2,611,625 | Kishline et al. | Sept. 23, 1952 |
| 2,708,003 | Nallinger et al. | May 10, 1955 |

FOREIGN PATENTS

| | | |
|---|---|---|
| 899,620 | France | Aug. 8, 1944 |